United States Patent
Oh

(10) Patent No.: US 10,432,046 B2
(45) Date of Patent: Oct. 1, 2019

(54) ROTOR, METHOD OF MANUFACTURING THE SAME, AND MOTOR INCLUDING THE ROTOR

(71) Applicant: LG Innotek Co., Ltd., Seoul (KR)

(72) Inventor: Ji Hwan Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 469 days.

(21) Appl. No.: 15/086,803

(22) Filed: Mar. 31, 2016

(65) Prior Publication Data

US 2016/0294234 A1    Oct. 6, 2016

(30) Foreign Application Priority Data

Mar. 31, 2015  (KR) .................. 10-2015-0045535

(51) Int. Cl.
| | |
|---|---|
| H02K 1/27 | (2006.01) |
| H02K 1/28 | (2006.01) |
| H02K 15/03 | (2006.01) |
| H02K 21/14 | (2006.01) |

(52) U.S. Cl.
CPC ............ H02K 1/276 (2013.01); H02K 1/28 (2013.01); H02K 15/03 (2013.01); H02K 21/14 (2013.01)

(58) Field of Classification Search
CPC .......... H02K 1/27; H02K 21/14; H02K 1/276; H02K 1/28; H02K 15/03
See application file for complete search history.

(56) References Cited

U.S. PATENT DOCUMENTS

| 5,581,140 A * | 12/1996 | Futami ................. | H02K 1/276 |
| | | | 310/156.53 |
| 9,680,341 B2 * | 6/2017 | Takeda ................ | H02K 1/2766 |
| 2013/0002082 A1 * | 1/2013 | Utsumi ................. | H02K 1/276 |
| | | | 310/156.53 |
| 2014/0077652 A1 * | 3/2014 | Yamagishi ........... | H02K 1/2766 |
| | | | 310/156.21 |
| 2015/0236555 A1 * | 8/2015 | Takeda ................ | H02K 1/276 |
| | | | 310/156.21 |

FOREIGN PATENT DOCUMENTS

| EP | 1983636 A1 * | 10/2008 | ........... H02K 1/2766 |
| JP | 2007037202 A * | 2/2007 | ............ H02K 1/276 |
| JP | 2007037202 A | 8/2007 | |
| JP | 2014003748 A | 9/2014 | |
| KR | 1020130017232 A | 2/2013 | |
| KR | 1020150133424 A | 11/2015 | |

OTHER PUBLICATIONS

JPO machine translation of JP 2007-037202, Sakaguchi, All pages.*
Extended European Search Report dated Aug. 16, 2016 in European Application No. 16162978.7.

* cited by examiner

*Primary Examiner* — Naishadh N Desai
(74) *Attorney, Agent, or Firm* — Saliwanchik, Lloyd & Eisenschenk

(57) ABSTRACT

The present invention relates to a motor for a vehicle and a rotor applied thereto. Provided is a rotor including a rotor core in which a plurality of rotor core members are stacked and a plurality of magnets inserted into magnet insertion holes of the rotor core, and further including fixing patterns that protrude toward the center of the magnet insertion holes from one sides of the magnet insertion holes of the rotor core members respectively disposed at an uppermost layer and a lowermost layer.

7 Claims, 5 Drawing Sheets

ROTOR, METHOD OF MANUFACTURING THE SAME, AND MOTOR INCLUDING THE ROTOR

CROSS-REFERENCE TO RELATED APPLICATION

This application claims priority under 35 USC. § 119 to Korean Patent Application No. 2015-0045535, filed Mar. 31, 2015, which is hereby incorporated by reference in their entirety.

BACKGROUND

1. Field of the Invention

The present invention relates to a motor for a vehicle and a rotor applied to the motor.

2. Discussion of Related Art

As a motor for a vehicle has been developed to a high specification such as high torque and high speed, a robust design is necessarily required for a rotor assembly structure applied to the motor. Generally, the rotor structure applied to an interior permanent magnet (IPM) motor has a structure in which a magnet is inserted into a stacked rotor core formed by stacking a plurality of rotor core members with a disk-shape.

In this case, the magnet inserted into the rotor core fixedly adheres to a magnet insertion hole using an adhesive, etc. However, a method of fixing using only an adhesive causes problems in which the magnet moves from an initial mounting position, a foreign material due to delamination of the adhesive is generated, and the magnet cannot be fixed due to glass transition at a high temperature since adhesion of the adhesive fixing the magnet is degraded when the motor is used for a long period or is used for long hours at a high temperature.

To solve the above problems, an adhesive capable of enduring a high temperature is required, but an application of the adhesive is difficult due to some problems of costs, ensuring permanent stability during high speed rotation, and economic feasibility.

BRIEF SUMMARY

The present invention is directed to a motor which is reliable by fixedly inserting magnets inserted into a rotor with no adhesive and implementing a magnet fixing pattern at a peripheral portion of a magnet insertion hole in an upper surface of a rotor member so as to eliminate an unstable operation and foreign material generation due to adhesive delamination caused by an external environmental change, and particularly, may prevent noises and vibrations due to a fixing defect of the magnet from being generated and also reduce process costs by implementing a stable fixing structure of the magnet using a fixing method by an axial pressure of the rotor.

According to an aspect of the present invention, there is provided a rotor including a rotor core in which a plurality of rotor core members are stacked and a plurality of magnets inserted into magnet insertion holes of the rotor core, and further including fixing patterns that protrude toward the center of the magnet insertion holes from one sides of the magnet insertion holes of the rotor core members respectively disposed at an uppermost layer and a lowermost layer.

Particularly, the rotor with the above described structure is implemented as a motor by including a motor housing, a stator disposed at the motor housing, a rotor disposed in the stator, and a shaft passing through the center of the rotor.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
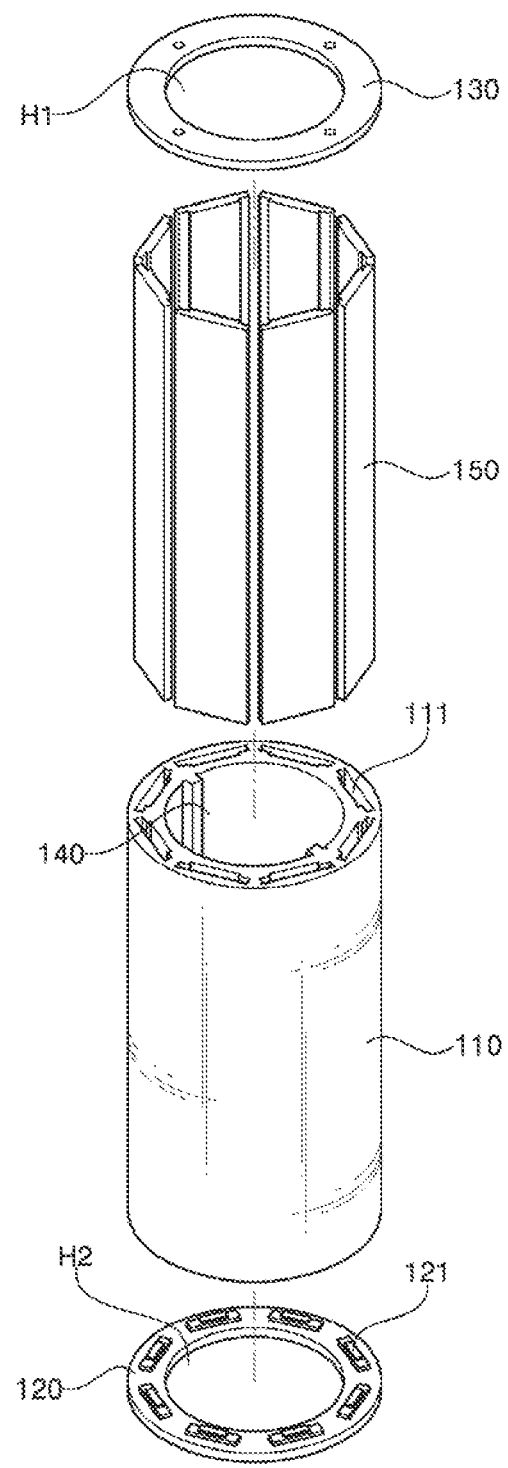
FIGS. 1 and 2 are schematic views for describing a structure of a rotor according to an embodiment of the present invention.

Hereinafter, configurations and operations according to the present invention will be described in detail with reference to the accompanying drawings. In the description with reference to the accompanying drawings, like elements are designated by like reference numerals regardless of drawing numbers, and duplicated descriptions thereof will be omitted. Although the terms "first," "second," etc. may be used herein to describe various elements, these elements are not be limited by these terms. These terms are only used to distinguish one element from another.

Figure 2:
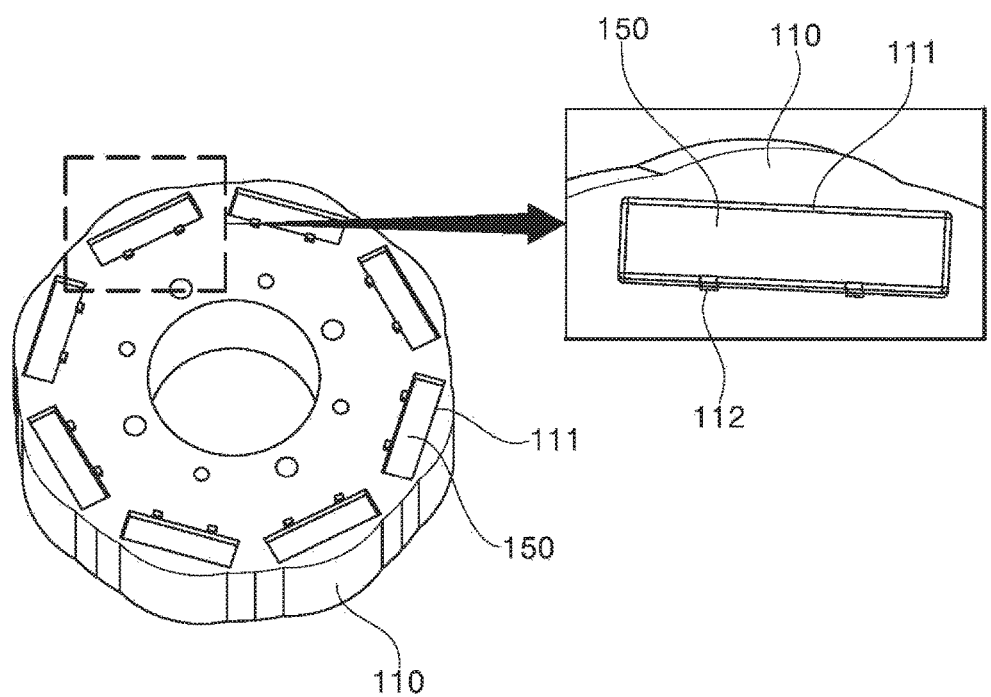
Figure 3:
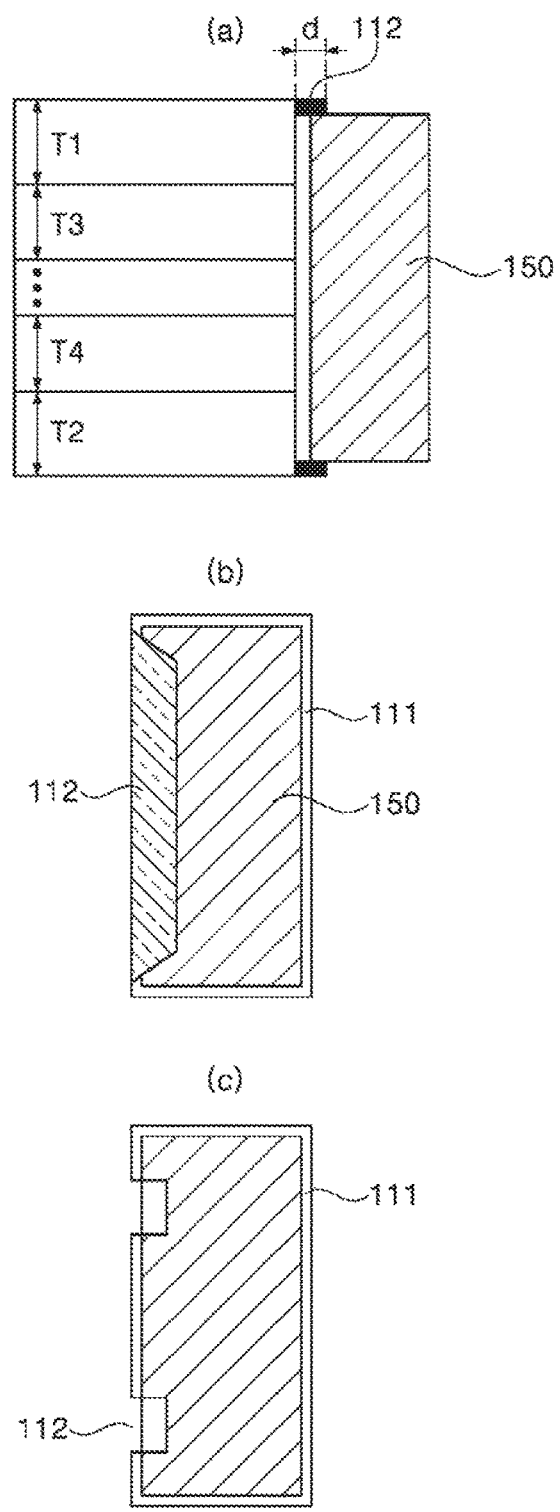
FIG. 3 is a cross-sectional schematic view for describing the structure of the rotor according to the embodiment of the present invention.

FIG. 1 is a schematic view for describing a structure of a rotor according to an embodiment of the present invention and FIG. 2 is a schematic view showing an enlarged main portion of the rotor in FIG. 1. In addition, FIG. 3 is a cross-sectional schematic view for describing a structure of the rotor according to the embodiment of the present invention and FIG. 4 is a process schematic view for describing a process of manufacturing the rotor according to the embodiment of the present invention.

Referring to FIGS. 1 and 2, a rotor 100 according to the embodiment of the present invention may include a rotor core 110 in which a plurality of rotor core members are stacked and a plurality of magnets 150 inserted into the rotor core 110. Particularly, the rotor 100 may further include fixing patterns 112. The fixing patterns 112 may protrude toward the center of magnet insertion holes from one sides of the magnet inserting holes of outermost rotor core members of the rotor core members implemented in a multilayer structure.

The fixing patterns 112 are implemented in a protruding structure from an edge part of the magnet insertion hole in a center direction. The fixing patterns 112 may fixedly support an upper surface or a lower surface of the magnet 150. In this case, the fixing patterns may be implemented as separate members, but, preferably, may be integrally implemented with the magnet insertion holes.

Figure 4:
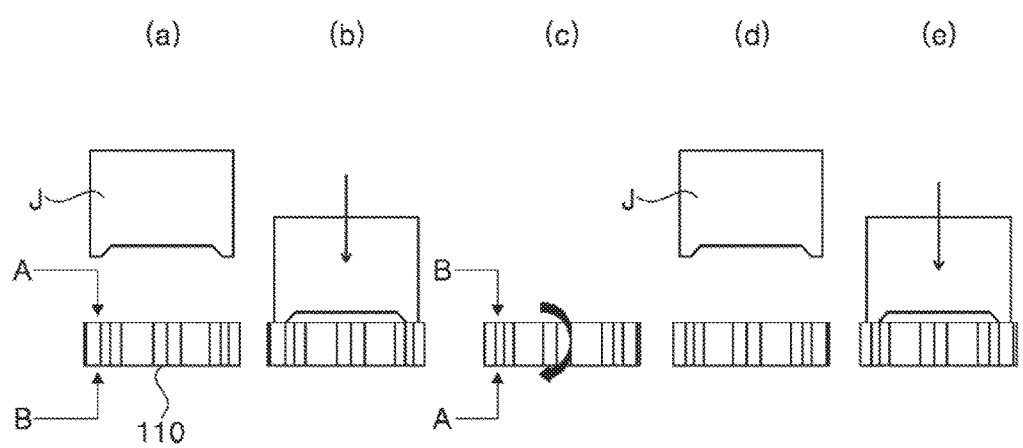
FIG. 4 is a process schematic view for describing a process of manufacturing the rotor according to the embodiment of the present invention.

For example, the fixing pattern 112 may be implemented to have an upper surface of a boundary portion protruding by a predetermined amount toward the magnet insertion hole by pressurizing a boundary area in which the magnet insertion hole of an uppermost magnet member is formed (see FIG. 4).

When the fixing patterns 112 are integrally implemented with a magnet member, more structural stability may be ensured, the above-described magnet may be stably fixed in the rotor core 110 using the fixing patterns 112, a problem caused by an adhesive may be solved, and uniform reliability may also be ensured by implementing a fixing structure without using a separate adhesive (hereinafter, referred to as 'a non-adhesive coupling structure').

FIG. 3 is a cross-sectional schematic view illustrating a structure of the fixing pattern 112.

Referring to FIG. 3, the fixing pattern 112 according to the embodiment of the present invention may be implemented in a protruding structure which fixedly supports the upper surface and the lower surface of the magnet 150 inserted into the rotor core 110 in which the plurality of rotor core members are stacked. Particularly, the fixing pattern 112 may be implemented in a structure which protrudes inward from the boundary portion of the magnet insertion hole and, as shown in FIGS. 3(A) and 3(B), the fixing patterns 112 may be implemented in a structure which covers a part of the upper surface or the lower surface of the magnet 150. In this case, the fixing patterns 112 may be implemented to protrude from side surfaces of the magnet insertion holes by 0.3 to 1.0 mm. When a thickness of the protrusion is less than 0.3 mm, a fixing force is weakened, and thus it is difficult to prevent the magnet from being separated. When the thickness of the protrusion is greater than 1.0 mm, a fixing force is increased, but a thickness deviation of the rotor core members with uniform thickness is influenced, and thus it is difficult to form a reliable magnetic force.

In another embodiment of the present invention, as shown in FIG. 3(A), apart from the uniform thicknesses of the rotor core members, thicknesses T1 and T2 of the rotor core members disposed at an uppermost layer and a lowermost layer of the rotor core may be greater than thicknesses T3 and T4 of the rotor core member.

Therefore, as in the process of FIG. 4, a change of the magnet member expanding to protrude from the boundary portion of the magnet insertion hole by pressurization is reduced, and an error due to the thickness deviation of each rotor core member may be reduced. In some embodiments, a ratio of the thicknesses T1 and T2 of the rotor core members disposed at the uppermost layer and the lowermost layer of the rotor core to the thicknesses T3 and T4 of the remaining rotor core members may satisfy a range of 1.1 to 2.0:1.

Further, structures of various fixing patterns according to the embodiment of the present invention may be variously changed in a shape having, as shown in FIG. 3(B), a structure in which a fixing pattern is in surface contact with a predetermined area of the upper surface or the lower surface of the magnet or, as shown in FIG. 3(C), a structure in which a plurality of protruding compositions are formed.

A method of implementing the fixing patterns will be described with reference to FIG. 4.

Referring to FIG. 4, first, (a) a plurality of rotor core members are stacked to form a rotor core 110, (b) fixing patterns are implemented by pressurizing boundary portions of the magnet insertion holes of the uppermost surface using a jig J, (c) magnets are inserted into the magnet insertion holes by rotating the rotor core 110, (d) the rotor core is fixed again, and (e) the fixing patterns are implemented by pressurizing boundary portions of the magnet insertion holes of the lowermost surface using the jig, and thus the magnets may be mounted and stably fixed.

In this case, a process of operation (b) and a process of operation (c) may be performed in reverse order. That is, the magnets are inserted first, and then the fixing patterns may be implemented on the upper and lower parts of the rotor core.

Hereinafter, referring to FIGS. 1 and 2, another configuration of the rotor according to the embodiment of the present invention will be described.

Referring to FIG. 1, the rotor core 110 is a composition formed by stacking a plurality of rotor core members with a thin planar disk shape. In this case, the rotor core member has a thin planar disk shape and is made of a steel sheet with a thickness of about 0.5 mm. The rotor core members are formed by performing a punching process on a thin steel sheet and are stacked to form the rotor core 110. In the center of the rotor core 110 formed with the multilayered rotor core members, a shaft coupling hole 140 to which a shaft is coupled is subsequently provided, and the shaft is pressed in and coupled to the shaft coupling hole 140, and thus the rotor core is installed in a motor to be rotated about the shaft.

A plurality of magnet insertion holes 111 may be provided in the rotor core 110. The magnet insertion holes 111 may have a hole shape extending in a longitudinal direction of the rotor core 110 so that a plurality of magnets are inserted thereinto.

The magnets 150 inserted and coupled in parallel to a central axis of the shaft coupling hole 140 are inserted into and coupled to the magnet insertion holes 111. In this case, it is preferable that the plurality of magnet insertion holes 111 be penetrated at regular intervals and, according to the embodiment of the present invention, 8 magnet inserting holes 111 are preferably disposed in a regular octagonal shape along an outer circumferential surface of the rotor core 110. Particularly, the fixing patterns 112 according to the embodiment of the present invention may protrude from the upper boundary portions of the magnet insertion holes 111 as described above.

Meanwhile, the number of magnet inserting holes 111 are increased or decreased rather than the 8 holes depending on a change in the size of the rotor core, or the like so that the magnet inserting holes may be disposed in a regular pentagonal shape (5 holes) or a regular hexagonal shape (6 holes), or the 8 magnet insertion holes or more may be provided. Particularly, in the embodiment of the present invention, the magnets and the magnet insertion holes are coupled to each other in a non-adhesive structure in which an adhesive material, such as an adhesive, etc., is not used between the magnet insertion holes 111 and the magnets 150 to be inserted, and the entirety or a part of an inner surface of the magnet insertion hole is in direct surface contact with an outer surface of the magnet with no adhesive.

Also, a pair of fixing plates 120 and 130 are disposed on an upper surface and a lower surface of the rotor core 110, and the fixing plates 120 and 130 are in surface contact with an uppermost surface and a lowermost surface of the multilayer structure of the rotor core member to be pressed in and coupled thereto. In this case, as a specific configuration of the present invention, the fixing plate 120 (hereinafter, referred to as 'a first fixing plate') disposed on a lower surface of the rotor core 110 of the fixing plates may be, as described above, implemented in a structure which compensates for an axial supporting force of the magnet by including a plurality of magnet fixing indentation patterns 121 that are predetermined protruding patterns formed by a surface process.

The first fixing plate 120 and the second fixing plate 130 are formed in a disk shape having a diameter corresponding to a diameter of the rotor core member, are formed so that all portions except for through holes 111 and 112 in the center of the plates into which the shaft will be inserted are blocked, and are processed so that the magnet fixing indentation patterns 121 implementing a non-adhesive coupling structure protrude. In this case, the through holes H1 and H2 are formed to correspond to a diameter of the shaft to be coupled with the fixing plates. Also, the first and second fixing plates have a thickness corresponding to the thickness of the rotor core member or the thickness of the first and the second fixing plates may be a little bit greater than that of the rotor core member. Also, it is preferable that the first and second fixing plates be formed to have a minimal thickness to miniaturize the rotor core 110.

Also, because it is preferable that the fixing plates and the rotor core member be easily fixed by a mutual interference and a plasticity deformation through a press-in process and be changed at the same coefficient of thermal expansion when thermal expansion and contraction are performed, it is preferable that the first and second fixing plates 120 and 130 be formed of the same material as the rotor core members. Further, it is preferable that the first and second fixing plates 120 and 130 be respectively coupled to exposed uppermost and lowermost surfaces of the rotor core 110 by a pressing force by the press-in process without a separate fixing unit and be in surface contact with the exposed surfaces of both ends of the rotor core 110.

Figure 5:
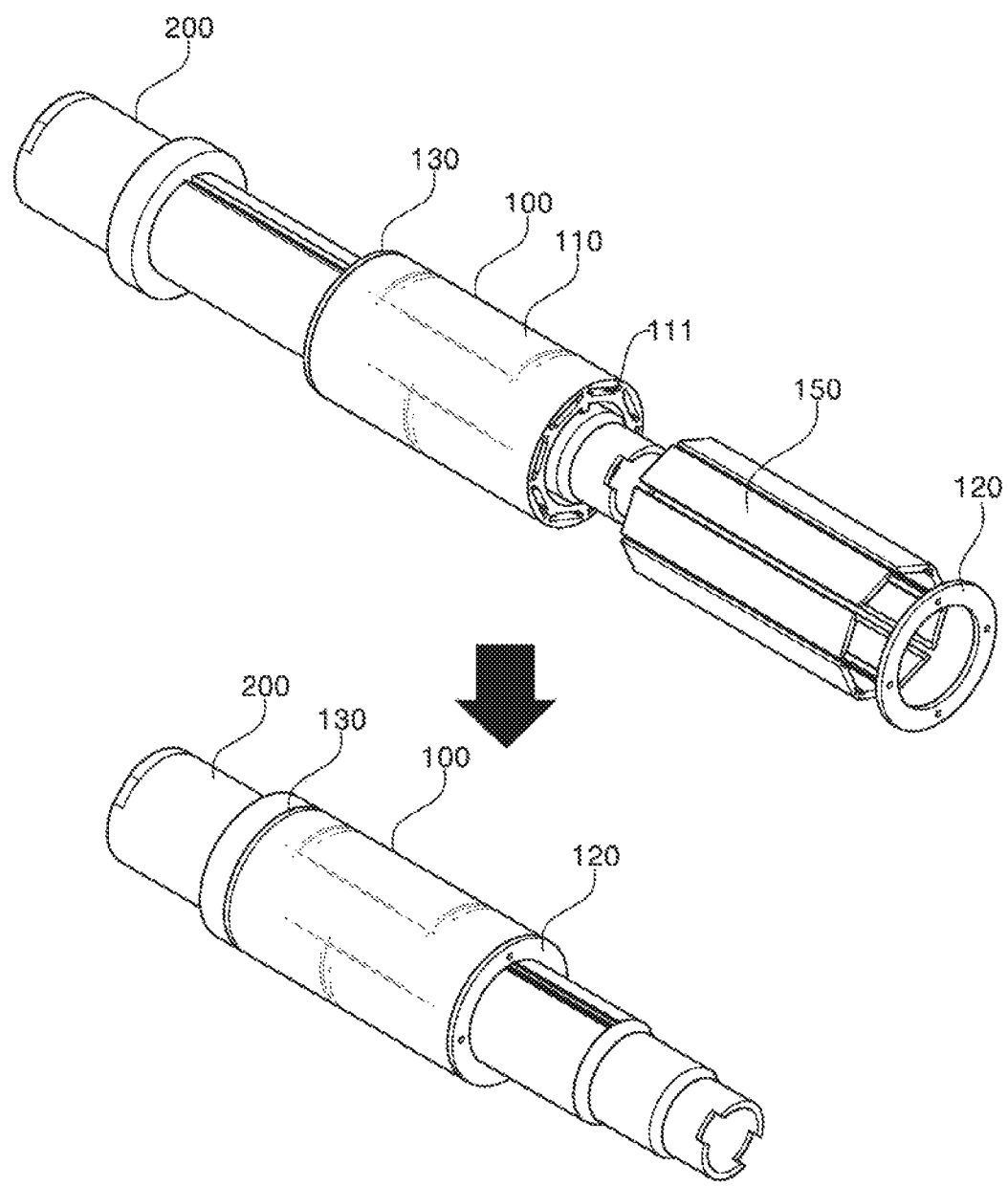
FIG. 5 illustrates an operational state view in which the rotor according to the embodiment of the present invention described in FIGS. 1 to 3 is coupled to a shaft and assembled.

FIG. 5 illustrates an operational state view in which the rotor according to the embodiment of the present invention described in FIGS. 1 to 3 is coupled to a shaft and assembled.

As shown in FIG. 5, a shaft 200 passing through the center of the rotor 100 according to the embodiment of the present invention described in FIG. 1 is coupled therewith, the fixing plates 120 and 130 are disposed on the upper and lower surfaces of the rotor 100, and particularly, fixing patterns are implemented at boundary portions of magnet insertion holes provided at uppermost and lowermost rotor core members to stably fix magnets. Therefore, the plurality of magnets 150 may be fixed with no adhesive. The rotor will be coupled to a composition, such as a motor housing and a stator, to implement various motors.

According to the embodiment of the present invention, a reliable motor can be implemented by fixedly inserting magnets inserted into a rotor without an adhesive and implementing a magnet fixing pattern at a peripheral portion of a magnet insertion hole on an upper surface of a rotor member so as to eliminate an unstable operation and foreign material generation due to adhesive delamination caused by an external environmental change.

The motor, which has a structure in which the magnet is fixed using the fixing patterns supporting the magnet from upper and lower directions of the magnet, can prevent noises and vibrations due to a fixing defect of the magnet from being generated and also reduce process costs by implementing a stable fixing structure of the magnet using a fixing method by an axial pressure of the rotor.

The detailed description of the present invention as described above has been described with reference to certain preferred embodiments thereof. However, various modifications may be made in the embodiments without departing from the scope of the present invention. The inventive concept of the present invention is not limited to the embodiments described above, but should be defined by the claims and equivalent scope thereof.

DESCRIPTION OF SYMBOLS

100: ROTOR
110: ROTOR CORE
111: MAGNET INSERTION HOLE
112: FIXING PATTERN
120: FIRST FIXING PLATE
121: MAGNETS FIXING INDENTATION PATTERN
130: SECOND FIXING PLATE
140: SHAFT COUPLING HOLE
150: MAGNET
200: SHAFT

What is claimed is:

1. A rotor comprising:
a rotor core in which a plurality of rotor core members are stacked; and
a plurality of magnets inserted into a plurality of magnet insertion holes of the rotor core, respectively,
wherein the rotor core includes a plurality of fixing patterns each having a shape of a trapezoid and extending from a surface of at least one of the magnet insertion holes toward a center of the rotor core and being respectively disposed at an uppermost layer or a lowermost layer of the rotor core;
wherein the plurality of fixing patterns is integrally implemented with the plurality of magnet insertion holes, respectively; and
wherein each of the plurality of fixing patterns protrudes from a side surface of the corresponding magnet insertion hole by 0.3 to 1.0 mm.

2. The rotor of claim 1, wherein each of the plurality of fixing patterns has a structure that covers a part of an upper surface or a lower surface of the magnet.

3. The rotor of claim 1, wherein each of the rotor core members that is disposed at the uppermost layer or the lowermost layer of the rotor core has a thickness greater than a thickness of any one of those of the remaining rotor core members, and
wherein a ratio of the thicknesses of the rotor core members disposed at the uppermost layer or the lowermost layer of the rotor core to the thicknesses of the remaining rotor core members is in a range of 1.1 to 2.0:1.

4. The rotor of claim 1, wherein a thickness of the rotor core is greater than thicknesses of each of the magnets, and
wherein the plurality of fixing patterns is in surface contact with parts of upper surfaces or lower surfaces of the magnets.

5. A rotor comprising:
a rotor core in which a plurality of rotor core members are stacked; and
a plurality of magnets inserted into a plurality of magnet insertion holes of the rotor core, respectively,
wherein the rotor core includes a plurality of fixing patterns each having a shape of a trapezoid and extending from a surface of at least one of the magnet insertion holes toward a center of the rotor core and being respectively disposed at an uppermost layer or a lowermost layer of the rotor core;
wherein the plurality of fixing patterns is integrally implemented with the plurality of magnet insertion holes, respectively;
wherein each of the rotor core members that is disposed at the uppermost layer or the lowermost layer of the rotor core has a thickness greater than a thickness of any one of those of the remaining rotor core members, and wherein a ratio of the thicknesses of the rotor core members disposed at the uppermost layer or the lowermost layer of the rotor core to the thicknesses of the remaining rotor core members is in a range of 1.1 to 2.0:1.

6. The rotor of claim 2, wherein each of the rotor core members that is disposed at the uppermost layer or the lowermost layer of the rotor core has a thickness greater than a thickness of any one of those of the remaining rotor core members, and
wherein a ratio of the thicknesses of the rotor core members disposed at the uppermost layer or the lowermost layer of the rotor core to the thicknesses of the remaining rotor core members is in a range of 1.1 to 2.0:1.

7. A motor comprising:
a motor housing;
a stator disposed at the motor housing;
a rotor disposed in the stator; and
a shaft configured to pass through the center of the rotor,
wherein the rotor includes a rotor core in which a plurality of rotor core members are stacked and a plurality of magnets inserted into a plurality of magnet insertion holes of the rotor core, respectively, and includes a plurality of fixing patterns each having a shape of a trapezoid and extending from a surface of at least one of the magnet insertion holes toward a center of the rotor core and being respectively disposed at an uppermost layer or a lowermost layer of the rotor core;
wherein the plurality of fixing patterns is integrally implemented with the plurality of magnet insertion holes, respectively; and
wherein each of the plurality of fixing patterns protrudes from a side surface of the corresponding magnet insertion hole by 0.3 to 1.0 mm.

* * * * *